United States Patent [19]
Charouhas

[11] Patent Number: 5,273,431
[45] Date of Patent: Dec. 28, 1993

[54] EDUCATIONAL GAME AND METHOD OF PLAYING SAID GAME

[76] Inventor: Thomas G. Charouhas, 29626 Meadow Mist Way, Agoura Hills, Calif. 91301

[21] Appl. No.: 942,013

[22] Filed: Sep. 8, 1992

[51] Int. Cl.$^5$ ........................................... G09B 19/22
[52] U.S. Cl. .................................. 434/129; 434/128; 434/156; 273/431; 273/243
[58] Field of Search ............... 434/128, 129, 156, 167; 273/236, 242, 243, 248, 431, 429

[56] References Cited

U.S. PATENT DOCUMENTS

| | | | |
|---|---|---|---|
| 895,128 | 8/1908 | Trant | 273/243 |
| 2,006,176 | 6/1935 | Quine | 273/248 |
| 3,734,508 | 5/1973 | Snyder | 273/249 |
| 4,089,527 | 5/1978 | Roth | 273/249 |

FOREIGN PATENT DOCUMENTS 2196263 4/1988 United Kingdom ................ 273/256

*Primary Examiner*—Gene Mancene
*Assistant Examiner*—Jeffrey A. Smith
*Attorney, Agent, or Firm*—John J. Posta, Jr.

[57] ABSTRACT

The educational linguistic game includes a game board having a number of separate, spaced tracks, each track being divided into a number of separate, sequential, color coded spaces bearing separate playing instructions, depending on the color of each space. The game also includes a number of dice, a number of player's tokens for moving along the spaces of the tracks, a roulette wheel bearing monetary indicia, play money and decks of educational game question cards, the number of the decks corresponding to the number of tracks, each deck being of a different level of difficulty of questions on the cards thereof. Game operating cards are also included: "chance" cards determining whether a player wins or loses play money; "no penalty" cards to pay off fines for wrong answers to questions on the game question cards; and, "player's choice" cards which permit a player to select the type of game question to be answered. The method is played by rolling dice and moving tokens along the spaces of the tracks, following instructions set out in those spaces and winning and losing money as a result of correctly and incorrectly answering questions on the question cards, until a predetermined game-winning mount of money is won by one of the players.

9 Claims, 4 Drawing Sheets

EDUCATIONAL GAME AND METHOD OF PLAYING SAID GAME

BACKGROUND OF THE INVENTION

1. Field of the Invention

The present invention generally relates to games of chance and skill and more particularly to an educational linguistic game and method of playing the same.

2. Prior Art

There are a great variety of board games which are played for amusement and social purposes. Few such games, however, have any educational value. It is generally recognized that the linguistic ability of most adults is relatively low. Yet it is also well known that success in business and in other walks of life to a great extent depends upon a person's ability to effectively communicate with others and to clearly express ideas. In order to do so, it is necessary to have a relatively large vocabulary of English words and phrases and a knowledge of their proper application. Moreover, it is necessary to know how to spell correctly those words and phrases.

In view of the above, there is a need for a linguistic game which will not only entertain but will also educate the players thereof in the correct spelling and usage of various English words and phrases and will improve their overall liguistic ability. Such game should be simple, fascinating, inexpensive and easy to play, and should be capable of accommodating a number of players.

SUMMARY OF THE INVENTION

The improved educational board game and method of playing the same, forming the present invention satisfy all the foregoing needs. The game and method are substantially as set forth in the Abstract of the Disclosure. The game can be played by two or more players at various levels of linguistic skill. It is primarily for adults with at least a high school knowledge of the English language. That knowledge readily expands as the game is played and replayed, serving as an effective educational tool, as well as an interesting and entertaining game of skill.

The educational linguistic game includes a game board having a number of separate, spaced tracks, each track being divided into a number of separate, sequential, color coded spaces bearing separate playing instructions, depending on the color of each space. The game also includes a number of dice, a number of player's tokens for moving along the spaces of the tracks, a roulette wheel bearing monetary indicia, play money and decks of educational game question cards, the number of the decks corresponding to the number of tracks, each deck being of a different level of difficulty of questions on the cards thereof. Game operating cards are also included: "chance" cards determining whether a player wins or loses play money; "no penalty" cards to pay off fines for wrong answers to questions on the game question cards; and, "player's choice" cards which permit a player to select the type of game question to be answered.

The method is played by rolling dice and moving tokens along the spaces of the tracks, following the instructions set out in those spaces and winning and losing money as a result of correctly and incorrectly answering questions on the question cards, until a predetermined game-winning amount of money is won by one of the players.

Further aspects of the invention are set forth in the following detailed description and accompanying drawings.

DRAWINGS

FIG. 1(a) is a schematic top plan view of the game board and roulette wheel portions of a preferred embodiment of the improved educational game of the present invention; and, FIG. 1(b) is a schematic top plan view of the play money, dice, decks of educational question cards, tokens and sets of "good news/bad news" chance cards, "no penalty" cards and "player's choice" cards forming the remainder of the preferred embodiment of the improved educational game of the present invention.

DETAILED DESCRIPTION

Figures 1(a) and 1(b)

Figure 1A:
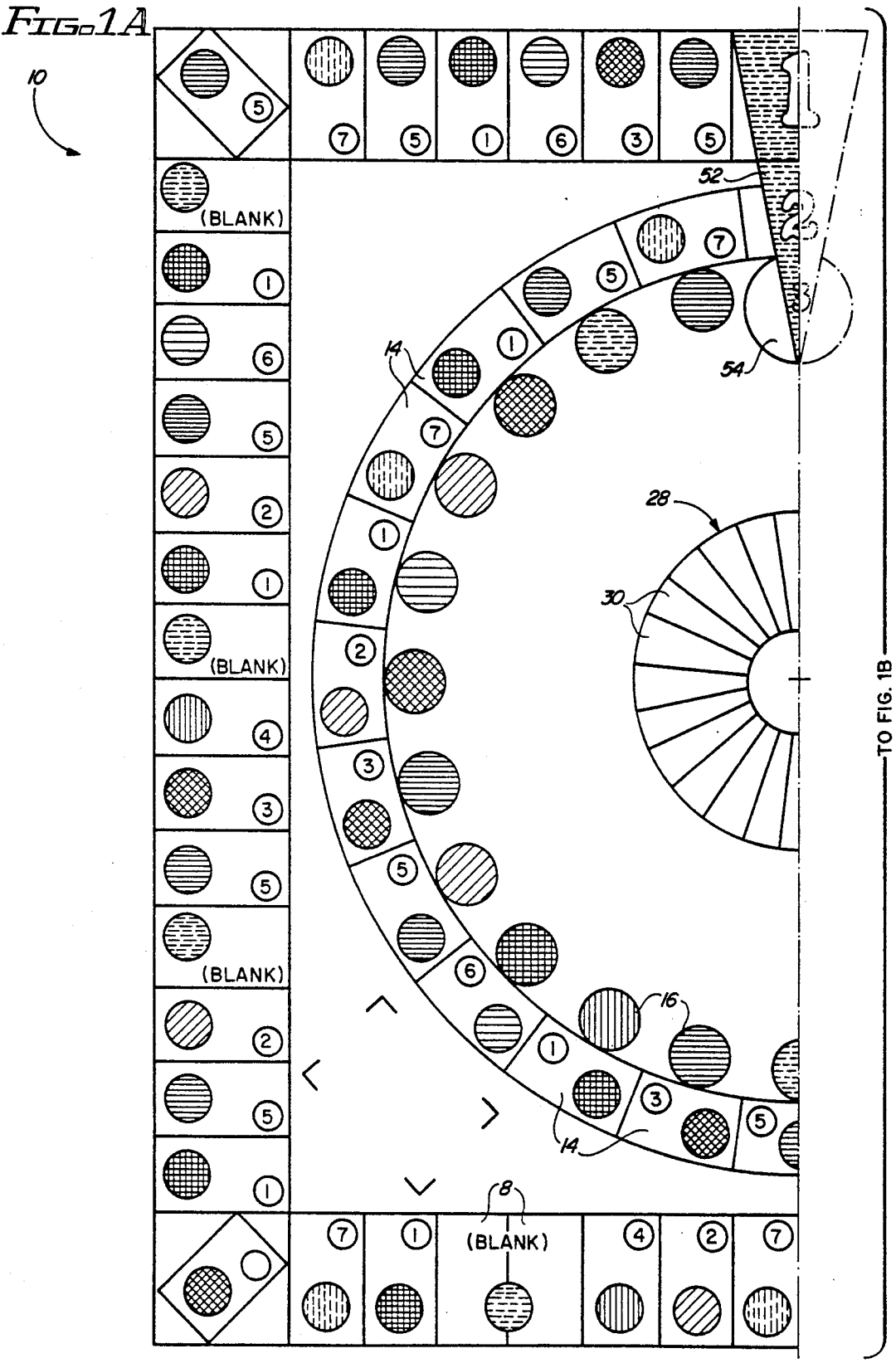
Figure 1B:
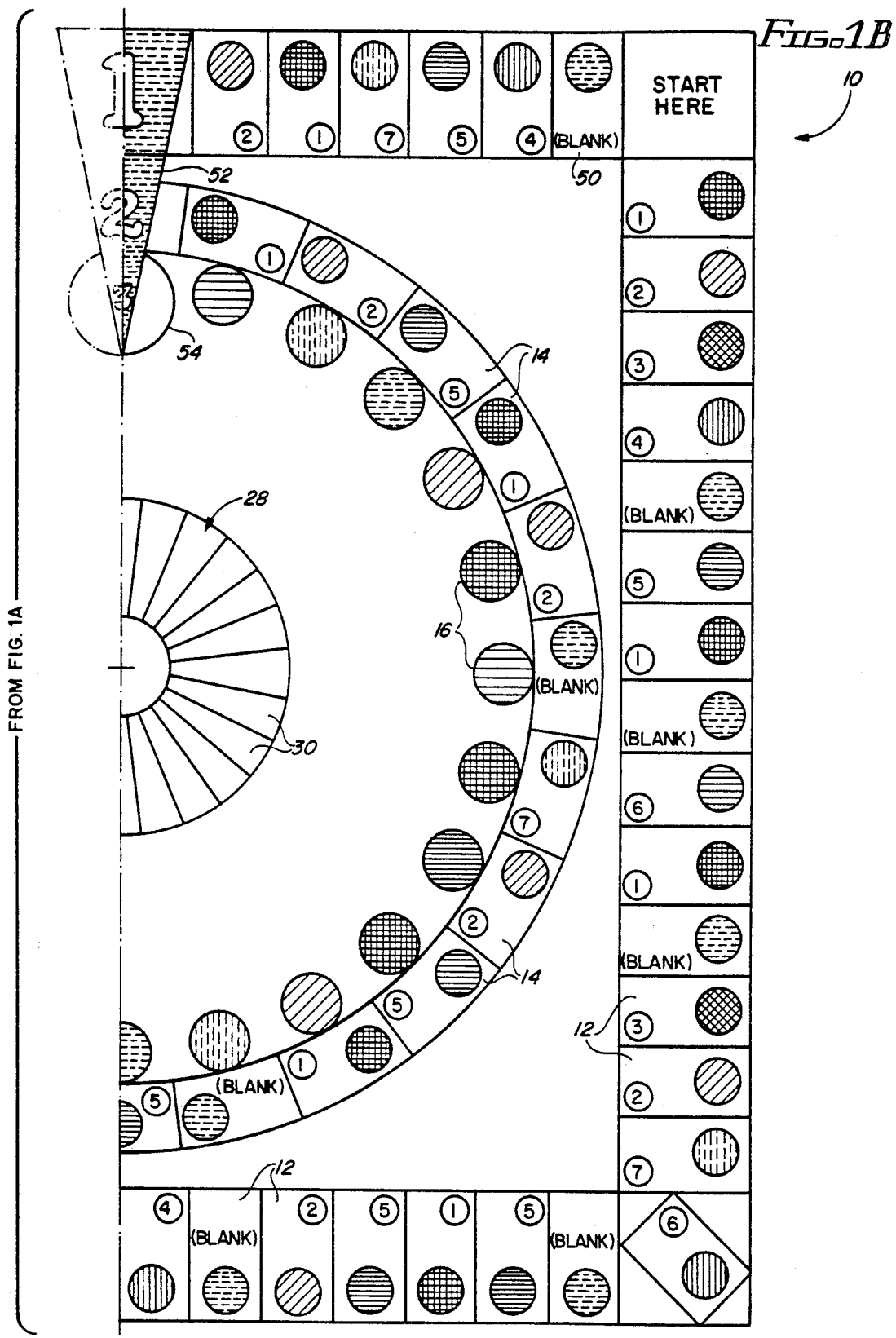
Figure 1C:
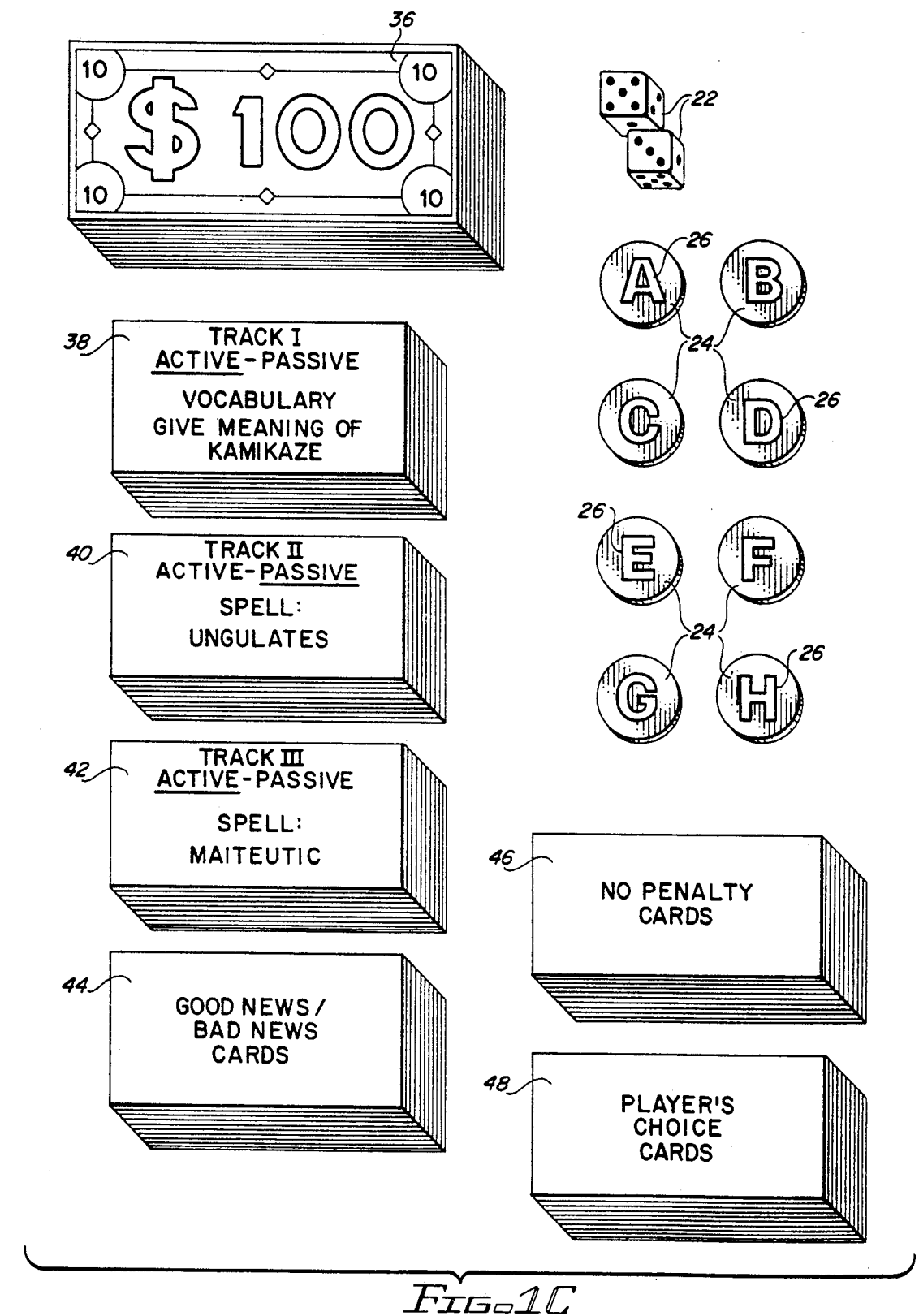
Figure 2:
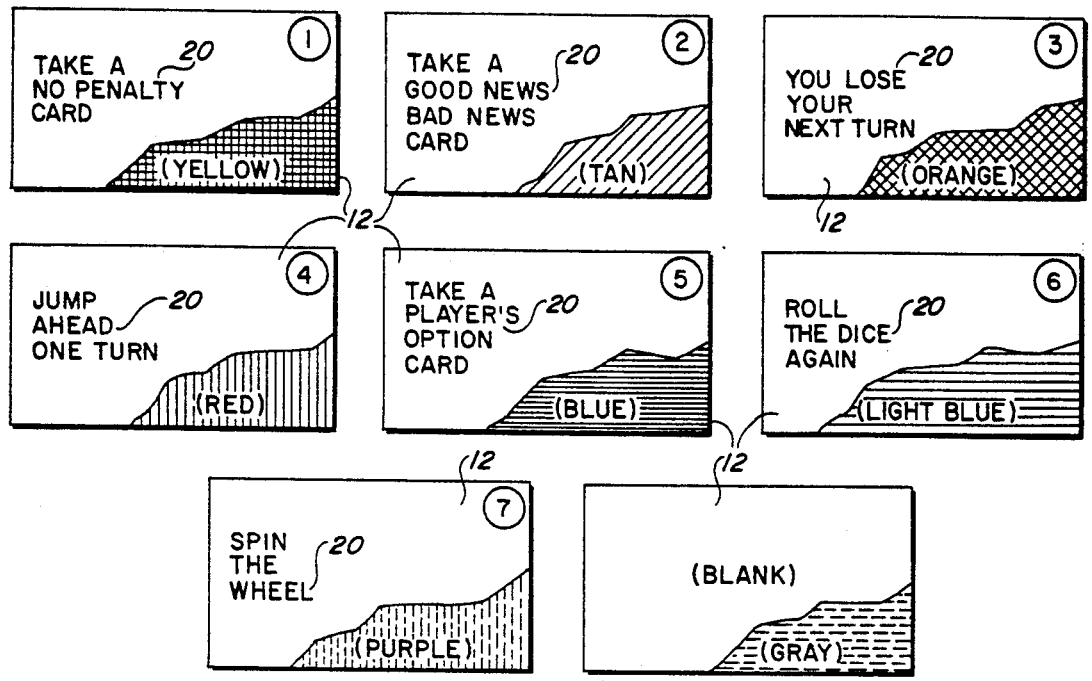
Figure 3:
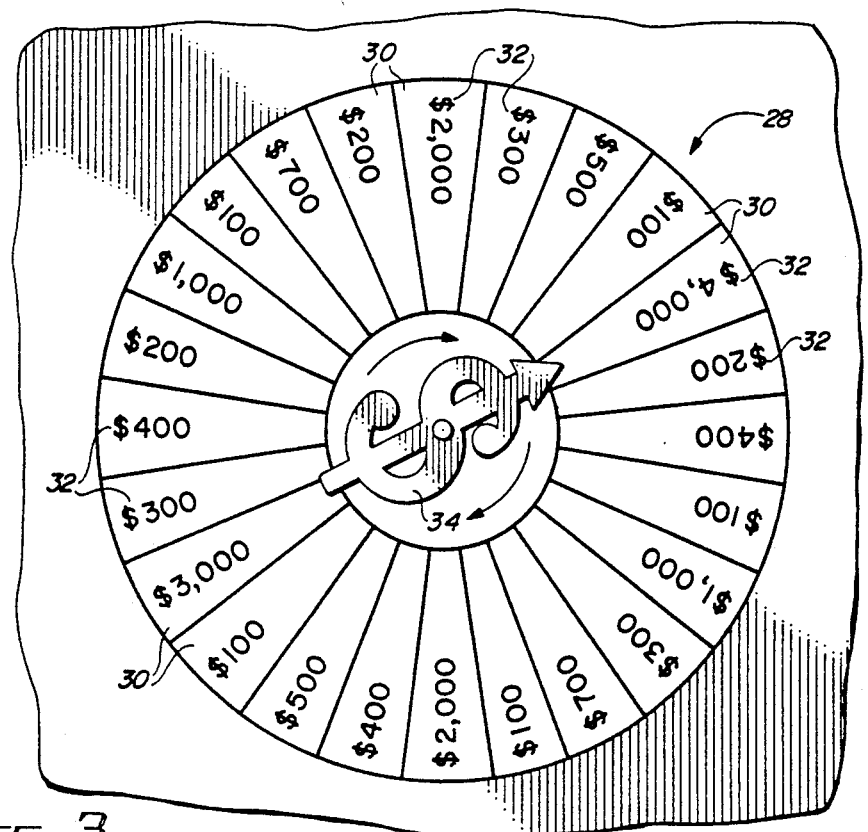

Now referring more particularly to FIGS. 1(a) and 1(b) of the drawings, a preferred embodiment of the improved educational board game of the present invention is schematically set forth therein. Thus, the game includes the following:

a) a game board 10 bearing three separate spaced tracks 12, 14 and 16, each of the tracks being divided into a plurality of separate sequential spaces 18 bearing game playing instructions 20 and being color coded, the color in each instance indicating the nature of the instruction 20;

b) two dice 22;

c) eight game player tokens 24, each token 24 bearing a separate letter 26 to distinguish it from the other tokens 24;

d) a roulette wheel 28 having a plurality of spaces 30, each bearing monetary indicia 32, and a spinner 34;

e) a stack 36 of play money;

f) three decks 38, 40 and 42 of educational game question cards, deck 38 having a low level of difficulty for the questions on the cards therein and being utilized with track 12, deck 40 having an intermediate level of difficulty of questions and being used with track 14, and desk 42 having a high level of difficulty of questions and being used with track 14, and deck 42 having a high level of difficulty of questions and being used with track 16; and, g) a plurality of sets of game operating cards, namely, a set 44 of chance cards known as "good news/bad news" cards, a set 46 of "no penalty" cards and a set 48 of "player's choice" cards.

Track 12 has a starting space 50, track 14 has a starting space 52 and track 16 has a starting space 54. Each deck 38, 40 and 42 has its question cards arranged in sets of four, each set bearing the same question, with one of the cards of each set having the answer on its reverse side and being used by the arbiter of the game to determine whether the question is answered correctly by the player drawing that card. The question on any given question card may have one of the following formats or another format: match-up, fill-in, multiple choice, true or false, error recognition, definition and completion of a blank space.

The general method of playing the game is as follows:

a) assigning a token 24 to each player, up to a total of eight individual or couple players, and rolling dice 22 by each player to see who goes first, that is, the order of play of the players, and to determine who is to act as the arbiter, that is, the question giver and settler of any dispute, and who is to act as the banker and pass out the play money as play proceeds;

b) having the banker give to each player a predetermined equal amount of play money before the game starts on track 12 and each time a player completes a circuit around track 12, 14 or 16, having advanced through all the spaces 18 thereof;

c) having each player in turn roll the dice to determine to what space 18 of a given track he or she advances, and then having that player immediately follow the color coded instructions for that space, the instructions falling into the following categories:

i. drawing a question from deck 38, 40 or 42, depending on what track the player is on and answering the question thereon to receive play money for a correct answer and to forfeit play money for an incorrect answer, ii. drawing a chance ("good news/bad news") card from set 44 and receiving or forfeiting play money as a result, iii. drawing a "no-penalty" card from set 46 to use to pay a fine for a wrong answer to a question on a question card, iv drawing a "player's choice" card from set 48, enabling the player to select the format of the question he or she is to be asked; and, d) continuing play by all players until one player accumulates a predetermined winning amount of play money.

The game can be played just using track 12. Alternatively, it can be played also using track 14 or track 14 and track 16. Advancement to each of these additional tracks is done by having a player accumulate enough play money to pay the predetermined advancement fee to the banker.

The following specific set of rules illustrates one form of the method and also gives additional details of the general method:

In tracks 12 and 14, players receive $300 at the beginning of play and another $300 thereafter each time they complete a turn around the board. For players who are in danger of elimination because of insolvency, the bank offers a one time only loan of $2,000. The borrowed money and an interest of $200 are due and payable anytime before the borrower graduates to a higher track 14 or 16. Eight individuals can play at one time. Partners may also play. In this case, the number sets of partners cannot exceed eight. A set of partners uses one game piece. A mix of singles and partners is also possible. In other words, a husband and wife may play as a team (one couple) or as two separate players.

Before the game can-begin, one player may volunteer to act as the arbiter. Besides playing his own game, he handles all game cards (except when it is his turn), works closely with the banker, and generally referees the game. His decision on disputes arising among players is final. Nevertheless, a handy, up-to-date dictionary is essential for convincing doubting Thomases. For his turn, the arbiter's functions temporarily devolve to the player on his right. The substitute arbiter may select a question card of of normal numerical sequence within a given deck 38, 40 or 42. Players may also volunteer to serve as the banker. The banker is responsible for all payments to players and is charged with collecting penalties and other assessments against players. He also arranges bank loans to players who desire them. Finally, it is the banker who approves and facilitates the promotion of players from one track to another.

If time is a consideration, a short game may be played using Track 12 only. This is the easiest of the three tracks 12, 14 and 16 (from beginning to end, the entire game is graded, progressing from relatively easy to difficult). Normal play takes the player through Track 12, promotion (at a cost of $3,000) to Tract 14, and then for $4,000 more, progression to Tract 16. When playing a Track 12 game only, a player needs to be the first to earn $10,000 to win. A two-track game (Tracks 12 and 14 only) calls for a payment of $3,000 to move from Track 12 to 14 and $4,000 after that game on Tract 14 until the front-runner comes up with the necessary $4,000.

All question cards come in sets of four. One of these four cards is marked "active". The arbiter works from this card. It usually has the question on one side and the answer on the other. The other three cards out of this set of four are marked "passive". One goes to the player who is at bat and the other two passive cards go for circulation among other players. This way, all players are continually apprised of what is going on. The three passive cards must be returned to the arbiter before the next player may take his turn.

There are only two occasions which depart from this modus operandi: a simple spelling question—one in which the player is asked to spell out a word—requires that the question be read to the player. These cards have a warning on the question side: "DO NOT SHOW THIS CARD TO PLAYER". Question cards that merely require recognition of spelling errors are treated in the normal fashion. Pronunciation question cards also must be treated differently. The arbiter should be careful not to read the question aloud. DO NOT READ ALOUD is clearly displayed across the face of three cards. Question cards with a red checkmark are considered to be more difficult than most other question cards. For this reason, a correct answer is worth more. (See SCORING AT A GLANCE sheet below).

Banker gives each tokened player $300 prior to beginning play. Players roll the dice and move their tokens the number of spaces indicated by the dice. A pair of sixes rolled is good for an extra roll.

Players may land on any one of eight different colors:

Lavender—the player does not draw a regular question card. He goes directly to the roulette wheel 28 of chance for a spin. The banker pays the player the amount won on the roulette wheel.

Tan—this is a "good news/bad news" card. Follow instructions on the card and then draw a regular question card.

Chartreuse—landing on this color entitles the player to draw a NO PENALTY card, in which case he turns it over to the bank for $20. The player also draws a regular question card.

Blue—when a token lands on this color, a player may draw a PLAYER'S OPTION card. This is also known as PLAYER'S CHOICE. He may decline the option and get $50 instead of the PLAYER'S CHOICE. Having declined the option, a player must still draw a regular question card.

Teal—a game piece landing on this color gives the player an extra roll of the dice, and instead of two, the player need draw only one question card.

Gold—stopping on this space results in a loss of turn. The player simply stays in place and skips a roll of the dice next time around.

Orange—the player jumps ahead one full turn, receiving $300 for the completed turn. He draws only once for the regular track question card.

Gray—this is a neutral card. The player draws a regular track question card.

After a player first rolls, the arbiter draws a track question card from the file. Usually, the arbiter gives a "passive" card to the player and two others for passing around to the other players (only the "active" card has both question and correct answer). At this point, the player must decide whether to pass or attempt to answer the question. A pass brings a penalty of $30. A wrong answer would cost the player $50. The right answer, on the other hand, would be worth $300. If a player decides to try to answer, he has up to a full minute to complete his or her response. The arbiter will call time if a player exceeds this limit.

When a player passes, any other player may venture to try his or her hand at answering the same question. Any interested player need only call out "dibs" before anyone else. If the volunteer gets the correct answer, he or she receives $300. An incorrect answer brings a fine of $25. Whenever a question is answered incorrectly, the arbiter is free to announce the correct response. Players would be well advised, during such responses of correct answers, to be both attentive and retentive. By design, a good number of questions are partially or fully repeated further on in the game. When answering any question, a player may hazard only one response. Second and third guesses are not acceptable. And when a question has more than one answer or part, correct answers are prorated. To illustrate, a card may carry a fill - in type of question requiring six word fill-ins. Regular track questions answered correctly are worth $300. Hence $300 divided by six is $50 for each correct word. The error penalty is applied if there is only one answer possible and it is wrong, or if all parts of a multifaceted question are answered incorrectly.

SCORING AT A GLANCE

| TRACKS 12 & 14 | |
| --- | --- |
| Banker gives each player at the start of the game, and for each completed turn on the board | $300 |
| Any regular track question - correct | $300 |
| Any regular track question - incorrect | −$50 |
| Second Chance - correct | $300 |
| Second Chance - incorrect | −$25 |
| TRACK 16 | |
| Any regular track question - correct | $400 |
| Any regular track question - incorrect | −$60 |
| Second Chance - correct | $400 |
| Second Chance - incorrect | −$30 |
| ALL TRACKS (12, 14 & 16) | |
| Player's Option card - correct | $400 |
| Player's Option card - incorrect | −$30 |
| Player's Option Second Chance - correct | $400 |
| Player's Option Second Chance - incorrect | −$15 |
| Cash in lieu of No Penalty card | $20 |
| Any question with a red check mark - correct | $500 |
| Any question with a red check mark - incorrect | −$50 |
| Player passes - penalty | −$30 |
| Bank Loans - one time only | $2,000 |
| interest | $200 |

CRITERIA FOR WINNING

Track 12 First player to accumulate $10,000.

Tracks 12 & 14 First player to pay bank $3,000 for promotion from Track 12 to 14, and first to earn an additional $7,000 after that.

Tracks 12, 14 & 16 Promotion from 12 to 14 (cost:$3,000), from 14 to 16 (cost: $4,000); first player to complete three turns of Track 16 and earn $5,000 on Tract 16.

The improved educational game 8 of the present invention is simple, inexpensive, educational and highly entertaining when played in accordance with the method of the present invention. Various other modes of play can be used and various other embodiments of game 8 can be employed.

All modifications, changes, alterations and additions in the components of game 8 and its parameters and in the steps and parameters of the present method as are within the scope of the appended claims form part of the present invention.

What is claimed is:

1. An educational game, said game comprising, in combination:
   a) a game board bearing a plurality of separate, spaced tracks, each said track being divided into a plurality of separate sequential spaces bearing game playing instructions;
   b) a plurality of dice;
   c) a plurality of game tokens;
   d) a roulette wheel bearing monetary indicia;
   e) play money;
   f) a plurality of decks of educational game question cards, the number of decks corresponding to the number of said tracks, each said deck being keyed to a separate one of said tracks, each said deck containing a plurality of sets of said game question cards, the cards of each said set having the same question, each one set of said plurality of sets having questions which differ from questions of each other set of said plurality of sets; and
   g) a plurality of game operating cards.

2. The educational game of claim 1 wherein said game questions are linguistic questions and wherein said game question cards within each said deck having a predetermined level of difficulty, and wherein said level of difficulty varies between said decks.

3. The educational game of claim 2 wherein said game operating cards comprise a) a set of chance cards determining whether a player wins or loses money; b) a set of "no penalty" cards used for paying fines for wrong answers to questions on said game question cards; and c) a set of "player's choice" cards which permit a player to determine the nature of the question on a game question card to be answered.

4. The educational game of claim 3 wherein each of said game question cards has a single, question format, and said single, question format is selected from the group consisting of: match-ups, fill-ins, multiple choice, true or false, error recognition, translation, definitions, and completions of blank spaces.

5. The educational game of claim 4 wherein said spaces of each said track are color coded, said color coding indicating said game playing instructions, and wherein each said track has a starting space and ending space.

6. An improved method of playing an educational game on a game board having a plurality of separate spaced tracks, each said track being divided into a plurality of separate sequential spaces bearing game playing instructions, said instructions comprising the following categories:
   i. drawing a question card from a deck thereof keyed to the track being played upon on as a result of the throw of said dice, and answering the question thereon to receive play money for a correct answer and to forfeit play money for an incorrect answer;

ii. drawing a chance card from a set thereof and as a result either receiving play money or forfeiting it, iii. drawing a "no penalty" card from a set thereof to pay a fine for a wrong answer to a question on a question card, and, iv. drawing a "player's choice" card from a set thereof which enables the player to select the type of question to be answered on a question card then to be drawn, said method comprising the steps of:

a) assigning a token to each player and rolling dice to determine the order of play between a plurality of players, and to determine who is to act as the game arbiter and who is to act as the game banker;

b) having the banker give to each player a predetermined amount of play money before the game starts and each time a player completes a circuit around one of said tracks, advancing through all the spaces of said track;

c) having each player for his turn roll the dice to determine on what space of a given track he or she lands, and immediately thereafter acting in accordance with the instructions on that space, and, d) continuing play by all said players until one of said players accumulates a predetermined amount of play money constituting a winning amount.

7. The method of claim 6 wherein said educational game question cards bear linguistic questions and wherein there is a separate deck of said question cards for each said track and wherein said decks of question cards differ in level of difficulty.

8. The method of claim 7 wherein the formats of said questions on said game question cards comprise the following: match-ups, fill-ins, multiple choice, true or false, error recognition, definitions and completions.

9. The method of claim 8 wherein there are sets of said question cards within each said deck, each said set bearing the same question and wherein said track spaces are color coded to indicate various playing instructions.

* * * * *